United States Patent [19]

Saionji et al.

[11] Patent Number: 5,561,473
[45] Date of Patent: Oct. 1, 1996

[54] CONTOUR CORRECTION SIGNAL GENERATING CIRCUIT

[75] Inventors: Osamu Saionji; Masami Aiura, both of Ibaraki, Japan

[73] Assignee: Motorola, Inc., Schaumburg, Ill.

[21] Appl. No.: 374,352

[22] Filed: Jan. 18, 1995

[30] Foreign Application Priority Data

Jan. 20, 1994 [JP] Japan .................... 6-004685

[51] Int. Cl.$^6$ .................. H04N 5/208; H04N 5/21
[52] U.S. Cl. ............. 348/628; 348/630; 348/666
[58] Field of Search ................ 348/630, 631, 348/628, 629, 627, 625, 252, 253, 606, 666, 665; H04N 5/208, 5/21, 5/213, 5/217

[56] References Cited

U.S. PATENT DOCUMENTS

| | | | |
|---|---|---|---|
| 4,041,531 | 8/1977 | Bingham | 348/625 |
| 4,489,346 | 12/1984 | Tawaka et al. | 348/666 |
| 4,661,842 | 4/1987 | Ishige et al. | 348/666 |
| 4,677,461 | 6/1987 | Mizutani et al. | 348/630 |
| 5,144,399 | 9/1992 | Nakayama et al. | 348/629 |

FOREIGN PATENT DOCUMENTS

| | | | |
|---|---|---|---|
| 15168 | 1/1989 | Japan | H04N 5/208 |
| 4304092 | 10/1992 | Japan | H04N 9/68 |

*Primary Examiner*—Safet Metjahic
*Attorney, Agent, or Firm*—Harry A. Wolin; Rennie William Dover

[57] ABSTRACT

A vertical contour correcting circuit that provides contour correction of a luminance signal at a horizontal color transition area of an image, thereby minimizing dot interference at the color transition area of a reproduced image. The vertical contour correcting circuit includes a vertical bandpass filter which outputs a level difference signal. The level difference signal is delayed to produce a first delay signal. The first delay signal is delayed to produce a second delay signal. An intermediate value signal is determined from the level difference signal, the first delay signal, and the second delay signal. The intermediate value signal and the first delay signal are added together so that their carrier color signal band components are canceled out.

5 Claims, 5 Drawing Sheets

CONTOUR CORRECTION SIGNAL GENERATING CIRCUIT

TECHNICAL FIELD

The present invention relates to a vertical contour correcting circuit for correcting the contour in the vertical direction in order to improve the sharpness of a picture derived from a color video signal in video apparatus such as color television receivers and videodisc players.

BACKGROUND

A vertical contour correcting circuit extracts a vertical luminance difference signal of a luminance signal and adds the extracted signal to the luminance signal at a certain level, thereby enhancing the contour in the vertical direction. FIG. 1 shows a prior art vertical contour correcting circuit. In this prior art circuit, an NTSC color video signal digitized at a sampling frequency of 4 $f_{sc}$ (where $f_{sc}$ is a subcarrier frequency), and its delayed versions delayed by 1 H (one horizontal interval) and 2 H, i.e., 1 H and 2 H delayed video signals, are supplied. The color video signal and 1 H and 2 H delayed video signals are supplied to a vertical BPF (band-pass filter) 11 in the vertical contour correcting circuit. The vertical BPF 11 extracts a level difference for a vertical DC component of the luminance signal, with its center frequency located at $f_h/2$ (where $f_h$ is a horizontal scan frequency). With the vertical BPF 11, the color video signal and 2 H delayed video signal are added by an adder 111, and the resulting sum is provided to a subtractor 113 via a ½ multiplier 112. The subtractor 113 subtracts the output signal of the ½ multiplier from the 1 H delayed video signal, and provides the resulting difference to a ½ multiplier 114. The output signal of the ½ multiplier 114 represents an output signal of the vertical BPF 11. Assuming that the color video signal, 1 H delayed video signal and 2 H delayed video signal are denoted by a, b, and c, respectively, then the output signal of the vertical BPF 11 is (b−(a+c)/2)/2.

Since the output signal of the vertical BPF 11 contains a frequency portion of 3.58 MHz, the 3.58 MHz frequency portion is removed from the output signal of the vertical BPF 11 by a LPF (low-pass filter) 12 having a notch at 3.58 MHz. The LPF 12 has four delay elements 121–124 connected in series from input terminal IN. The delay elements 121–124 delay the signal by 70 nsec (sampling period) as delay time T. In addition, an adder 126 is provided which adds the input signal applied to the input terminal IN with the output signal of the delay element 124, while an adder 126 is connected to the output of the delay element 122. The adder 126 adds the output signal of the adder 125 to the output signal of the delay element 122. That is, assuming that the signal of the input terminal IN, the output signal level of the delay element 122, and the output signal level of the delay element 124 are denoted by A, B, and C, respectively, then the output level of the adder 126 is represented by (B+(A+C)/2)/2, so that only a DC portion is extracted. It should be appreciated that the adders 125 and 126 are capable of scaling by half and outputting the signal level of their resultant sum.

For the output signal of the LPF 12, its signal portion below a predetermined level is cut by a noise slice circuit 13, and then supplied to a clip circuit 14. The clip circuit 14 limits a high-level portion of the output signal of the noise slice circuit 13. The noise slice circuit 13 and clip circuit 14 have an input/output characteristic as shown in FIG. 3.

On the other hand, the color video signal and 1 H and 2 H delayed video signals are supplied to a comb filter 15. The comb filter 15 extracts a carrier color signal contained in the color video signal. The 1 H delayed video signal is supplied to a subtractor 16, where the carrier color signal extracted by the comb filter 15 is subtracted from the 1 H delayed video signal to extract a luminance signal. The resulting luminance signal is supplied to an adder 17, where it is added with the output signal of a noise slice circuit 13, thereby providing contour correction. It should be appreciated that the comb filter 15 and subtractor 16 comprise a luminance signal/color signal separation circuit.

With such a prior art vertical contour correcting circuit, only the color signal component passes through the vertical BPF 11, the signals A, B, and C have a time difference of 140 nsec, i.e., a phase difference of 180°, with each other, even though they are passed through the LPF 12; as such, for horizontal transition of color, a mixture of color phase information before and after such transition is outputted from the adder 126. Thus, if the luminance signal is contour-corrected with a correction signal containing such color phase information, improper contour correction results, so that dot interference might occur in color transition areas of a reproduced image.

Accordingly, it is an object of the present invention to provide a vertical contour correcting circuit that provides proper contour correction on a luminance signal in a horizontal color transition area of an image, thereby allowing for reduction of dot interference in the color transition area of a reproduced image.

SUMMARY OF THE INVENTION

A vertical contour correcting circuit of the present invention comprises: a vertical band-pass filter for generating a level difference signal for a vertical DC component in a digitized color video signal; a contour correction signal generating means for removing a carrier color signal band portion in the output signal of the vertical band-pass filter to generate a contour correction signal; and an adding means for adding the contour correction signal to a luminance signal in the color video signal separated by a luminance signal/color signal separation circuit, wherein the contour correction signal generating means includes: a first delay means for outputting a first delay signal where the first delay signal is the level difference signal delayed by a first predetermined time; a second delay means for outputting a second delay signal where the second delay signal is the level difference signal delayed by a second predetermined time; a phase inverting means for inverting a phase relationship between the first delay signal, and the level difference signal and second delay signal; an intermediate value selecting means for selecting as an intermediate value signal a signal having an intermediate value between the level difference signal and the first and second delay signals derived via the phase inverting means; and an adding means for adding the first delay signal outputted from the first delay means and the intermediate value signal so that their carrier color signal band components are canceled out.

With the vertical contour correcting circuit of the present invention, the level difference signal outputted from the vertical band-pass filter is delayed by first and second delay means in the contour correction signal generating means, so that the first delay signal, which is the level difference signal delayed by a first predetermined time, is outputted from the first delay means, while a second delay signal, which is the level difference signal delayed by a second predetermined time, is outputted from the second delay means. After a phase relationship between the first delay signal, and the level difference signal and second delay signal is inverted, a signal having an intermediate value is outputted from the intermediate value selecting means as an intermediate value signal, and the first delay signal from the first delay means is then added with the intermediate value signal so that their carrier color signal band components are canceled out.

DETAILED DESCRIPTION OF THE PREFERRED EMBODIMENT

An embodiment of the present invention will be described hereinbelow with reference to the drawings.

Figure 1:
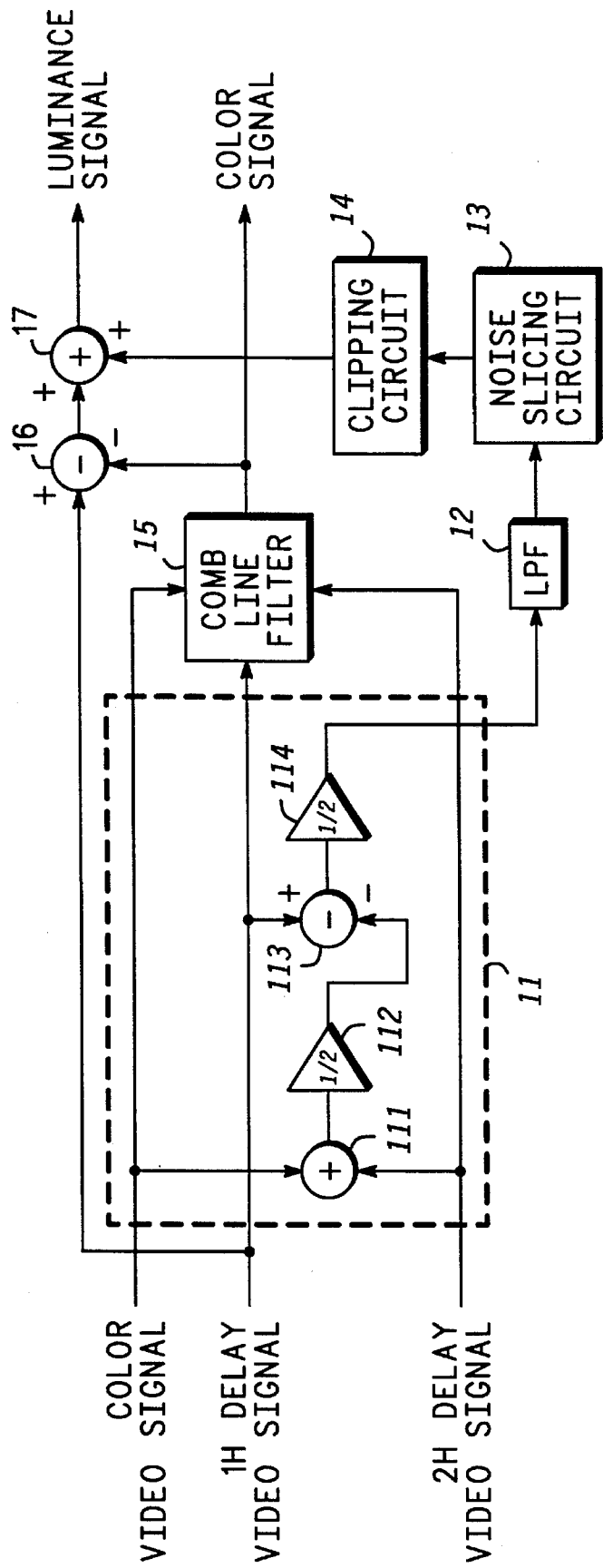
FIG. 1 is a block diagram showing a prior art vertical contour correcting circuit.
Figure 2:
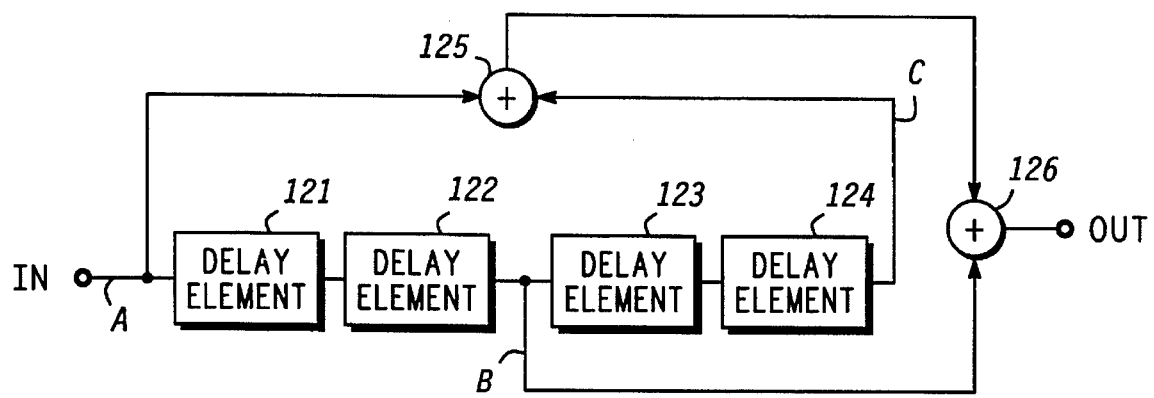
FIG. 2 is a block diagram showing a specific arrangement of the LPF within the circuit of FIG. 1.
Figure 3:
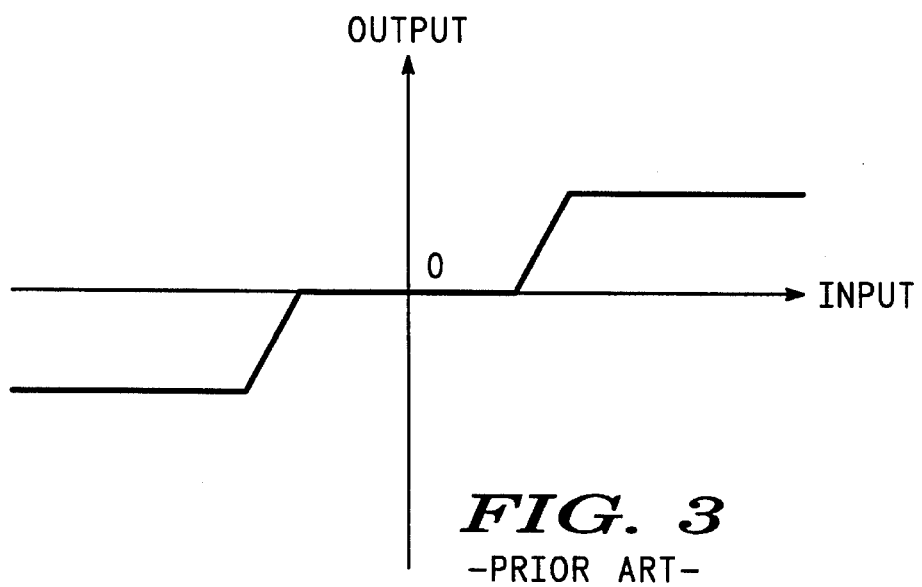
FIG. 3 is a plot showing a composite input/output characteristic of the noise slice circuit and clip circuit.
Figure 4:
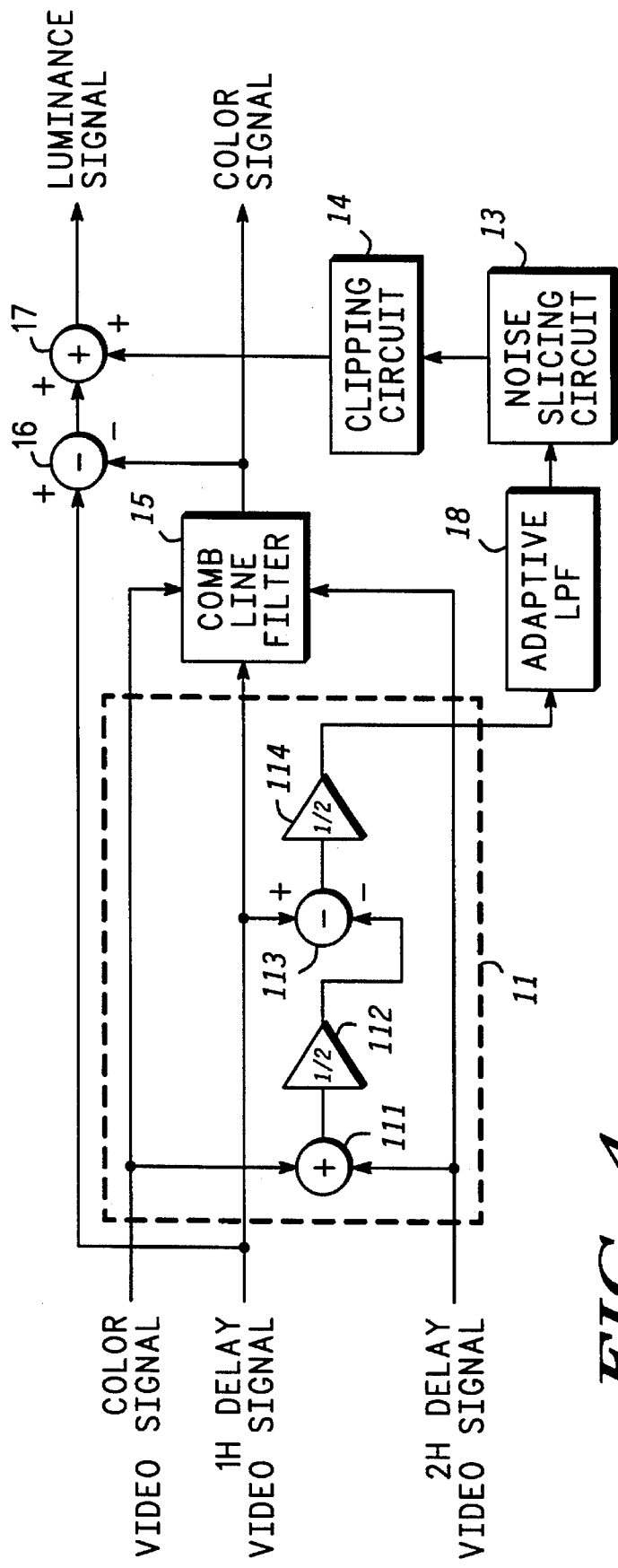
FIG. 4 is a block diagram showing an embodiment of the present invention.

FIG. 4 shows a vertical contour correcting circuit according to the present invention. With this vertical contour correcting circuit, vertical BPF 11, noise slice circuit 13, clip circuit 14, comb filter 15, subtractor 16 and adder 17 are the same as those used in the prior art circuit and indicated by the same reference numbers. Between the vertical BPF 11 and noise slice circuit 13 is provided an adaptive LPF 18.

Figure 5:
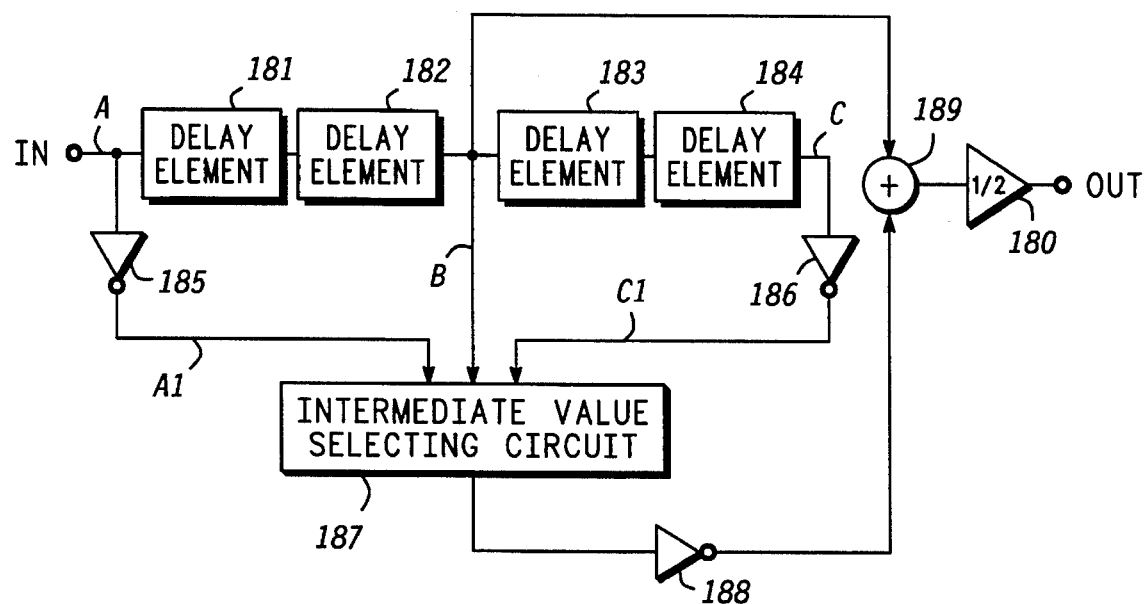
FIG. 5 is a block diagram showing a specific arrangement of the adaptive LPF within the circuit of FIG. 4.

More specifically, the LPF 18 has four delay elements 181–184 connected in series from an input terminal IN, as shown in FIG. 5. The delay elements 181–184 delay a signal by 70 nsec (sampling period) as delay time T. To the input terminal IN and the output of the delay element 184 are connected inverters 185 and 186, outputs of which are supplied, along with the output signal of the delay element 182, to an intermediate value selecting circuit 187. The intermediate value selecting circuit 187 comprises, for example, a comparator, so that it compares values of the three input signals to detect an intermediate value, i.e., a value other than the maximum and minimum values. It should be appreciated that if two of the three values are the same, that same value is selected, and if all the three values are the same, that same value is selected.

To the output of the intermediate value selecting circuit 187 is connected an adder 189 via an inverter 188. The adder 189 adds the phase of the output signal of the intermediate value selecting circuit 187 with the signal inverted by the inverter 188 and the output signal of the delay element 182. The output signal of the adder 189 is supplied to an output terminal OUT of the LPF 18 via a ½ multiplier 180.

With the vertical contour correcting circuit so configured according to the present invention, an NTSC input color video signal digitized at 4 $f_{sc}$ sampling frequency, similar to the prior art circuit, is supplied along with its 1 H (one horizontal scan interval) and 2 H delayed video signals, and the BPF 11 extracts a level difference for a vertical DC component of the luminance signal from the color video signal, and 1 H and 2 H delayed video signals.

Figure 6:
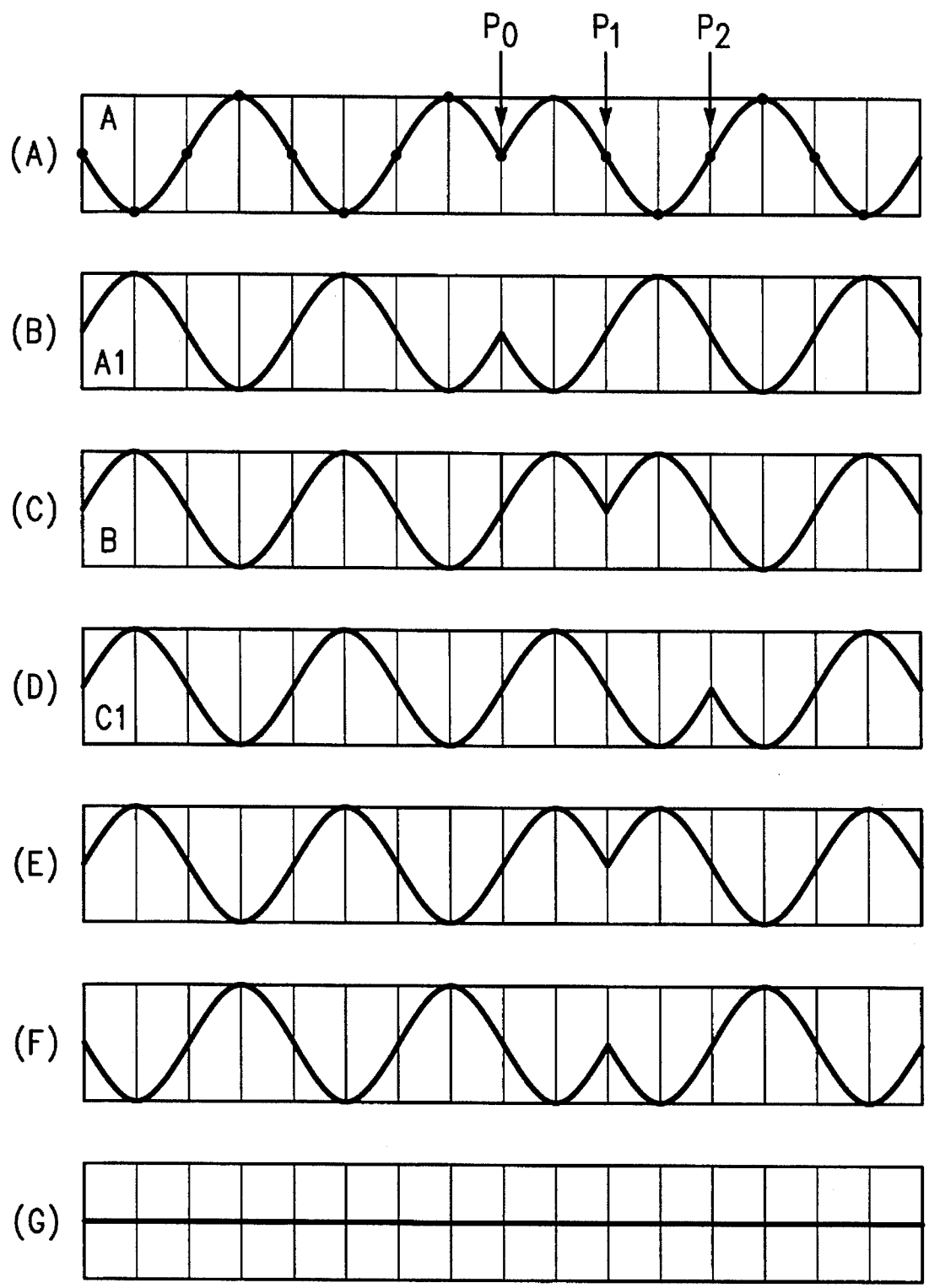
FIG. 6 comprises signal waveforms at various portions within the adaptive LPF.

The output signal of the vertical BPF 11 is delayed by the delay elements 181–184 in the LPF 18. Assuming that the input signal from BPF 11, the output signal (first delay signal) of the delay element 182, and the output signal (second delay signal) of the delay element 184 are denoted by A, B, and C, respectively, and also assuming that carrier color signal component of the input signal A changes as shown in FIG. 6(a), then the output signal A1 of the inverter 185 is inverted in phase with respect to the signal A, as shown in FIG. 6(b). Note that dots on the waveform in FIG. 6(a) represent sampling points. The carrier color signal component of the output signal B of the delay element 182 is delayed by 180° in color signal phase with respect to the signal A. Because the output signal C of the delay element 184 is further delayed by 180° with respect to the signal B and is phase-inverted by the inverter 186, the output signal C1 of the inverter 186 changes as shown in FIG. 6(d).

At the intermediate value selecting circuit 187, an intermediate value of signals A1, B, and C1 is detected. For the same color, signals A1, B, and C1 have the same waveform. That is, if the color changes at sampling point P0 of the signal A, the same waveforms are observed up to point P0 as shown in FIGS. 6(b) through (d). Thus, the output signal of the intermediate value selecting circuit 187 has the same waveform as the signals A1, B and C, as shown in FIG. 6(e). The signal A1 indicates a new color from point P0 where color has changed to point P1 which is delayed by 180° while the signals B and C1 indicate the color that remains as before. Thus, either the signal B or C1 is selected. The signals A1 and B indicate a new color over a range from point P1 to point P2 further delayed by 180°, while the signal C1 indicates the color that remains as before. Thus, either the signal A1 or B is selected. After point P2, since the signals A1, B and C all indicate a new color, the output signal of the intermediate value selecting circuit 187 has the same waveform as that of signal A1, B and C1. In this way, the signal outputted from the intermediate value selecting circuit 187 will not induce a mixture of signals indicative of different colors before and after a color transition.

The output signal of the intermediate value selecting circuit 187 is phase-inverted by the inverter 188, as indicated in FIG. 6(f). The output signal of the inverter 188 is added to the signal B by the adder 189, and subsequently converted to one half the signal level by the ½ multiplier 189. Thus, color signal components are canceled out before being outputted from the LPF 18, as shown in FIG. 6(g).

For the level difference signal of the luminance signal where color signal components are removed, signal portions below a predetermined level are cut by the noise slice circuit 13, and positive and negative high-level components are limited by the clip circuit 14. The luminance signal in the color video signal extracted by the comb filter 15 and subtractor 16 is supplied to the adder 17, where it is added to the output signal of the noise slice circuit 13, thereby providing contour correction. Thus, the contour-corrected luminance signal is prevented from containing a mixture of color phase information, before and after transition, at a horizontal color change.

In the above embodiment, although the sampling frequency is 4 $f_{sc}$, it is clear that this is not a limitation, but the present invention is applicable to other frequencies of 2×n (where n is an integer) $f_{sc}$.

Figure 7:
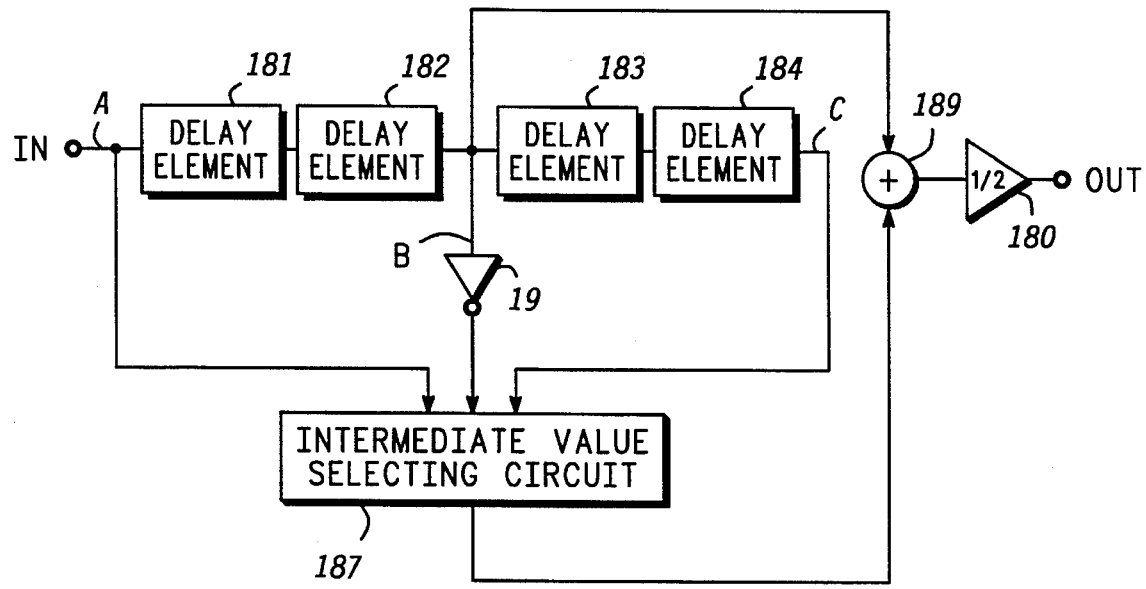
FIG. 7 is a block diagram showing another arrangement of the adaptive LPF within the circuit of FIG. 4.

Additionally, the adaptive LPF 18 in the above embodiment may be configured as indicated in FIG. 7. In this case, there is an advantage that only one inverter (inverter 19) is needed as compared to the arrangement shown in FIG. 5.

Thus, with the vertical contour correcting circuit of the present invention, because an intermediate value signal derived based on a level difference signal outputted from the vertical band-pass filter, a first delay signal where the level difference signal is delayed by a first predetermined time, and a second delay signal where the level difference signal is delayed by a second predetermined time will not contain a mixture of signals indicative of different colors before and after color transition, the first delay signal and intermediate value signal may be added so that their carrier color signal band components are canceled out, thereby preventing output of a contour correction signal at an area of horizontal color transition where color phase information is mixed before and after the color transition. Therefore, since contour correction is made properly for a luminance signal at an area of horizontal color transition of an image, dot interference may be minimized at the horizontal color transition area of the image.

We claim:

1. A vertical contour correcting circuit, comprising:
    a vertical band-pass filter for generating a level difference signal for a vertical DC component in a digitized color video signal;
    a contour correction signal generating means for removing a carrier color signal band component in the output signal of said vertical band-pass filter to generate a contour correction signal; and
    an adding means for adding said contour correction signal to a luminance signal in said digitized color video signal separated by a luminance signal/color signal separation circuit, said contour correction signal generating means including:
        a first delay means for outputting a first delay signal where the first delay signal is the level difference signal delayed by a first predetermined time;
        a second delay means for outputting a second delay signal where the second delay signal is the level difference signal delayed by a second predetermined time;
        a phase inverting means for inverting a phase relationship between said first delay signal, and said level difference signal and said second delay signal;
        an intermediate value selecting means for selecting as an intermediate value signal a signal having an intermediate value between said level difference signal and said first and second delay signals derived via said phase inverting means; and
        an adding means for adding said first delay signal outputted from said first delay means and said intermediate value signal so that their carrier color signal band components are canceled out.

2. A vertical contour correcting circuit according to claim 1, wherein:
    said phase inverting means includes a first inverter for inverting a phase of said level difference signal outputted from said vertical band-pass filter, and a second inverter for inverting a phase of said second delay signal outputted from said second delay means, said phase inverting means supplying the output signals of said first and second inverters and said first delay signal outputted from said first delay means to said intermediate value selecting means; and
    said adding means includes a third inverter for inverting a phase of said intermediate value signal outputted from said intermediate value selecting means, a first adder for adding the output signal of said third inverter with said first delay signal outputted from said first delay means, and a multiplier for scaling the result of the addition of said first adder by ½.

3. A vertical contour correcting circuit according to claim 1, wherein:
    said phase inverting means includes an inverter for inverting a phase of said first delay signal outputted from said first delay means, said phase inverting means supplying said level difference signal outputted from said vertical band-pass filter, said second delay signal outputted from said second delay means, and the output signal of said inverter to said intermediate value selecting means; and
    said adding means includes an adder for adding said intermediate value signal outputted from said intermediate value selecting means with said first delay signal outputted from said first delay means, and a multiplier for scaling the result of the addition of said adder by ½.

4. A vertical contour correcting circuit according to claim 1, wherein said first predetermined time comprises a time corresponding to 180° in phase difference for the carrier color signal band component, and said second predetermined time comprises a time corresponding to 360° in phase difference for the carrier color signal band component.

5. A vertical contour correcting circuit according to claim 1, wherein said digitized color video signal is sampled at 2×n (n is an integer) the subcarrier frequency, and wherein said first and second delay means are connected in series, each having a signal delay function for an n-sampling frequency.

* * * * *